(12) United States Patent
Anwer

(10) Patent No.: US 7,818,467 B2
(45) Date of Patent: Oct. 19, 2010

(54) METHOD OF INDENTIFYING DEVICES IN MOBILE AND DESKTOP ENVIRONMENTS

(75) Inventor: Juraid Anwer, London (GB)

(73) Assignee: Key Criteria Technology Limited (GB)

( * ) Notice: Subject to any disclaimer, the term of this patent is extended or adjusted under 35 U.S.C. 154(b) by 329 days.

(21) Appl. No.: 12/021,235

(22) Filed: Jan. 28, 2008

(65) Prior Publication Data

US 2008/0195769 A1     Aug. 14, 2008

(30) Foreign Application Priority Data

Jan. 26, 2007    (GB)    ................................ 0701513.4

(51) Int. Cl.
  *G05B 13/00*    (2006.01)
(52) U.S. Cl. ................................ 710/10; 710/62; 710/8
(58) Field of Classification Search ........................ None
  See application file for complete search history.

(56) References Cited

U.S. PATENT DOCUMENTS

| | | | |
|---|---|---|---|
| 5,819,107 A | 10/1998 | Lichtman et al. | |
| 6,009,480 A | 12/1999 | Pleso | |
| 6,052,739 A | 4/2000 | Bopardikar et al. | |
| 6,347,398 B1 | 2/2002 | Parthasarathy et al. | |
| 6,714,969 B1 | 3/2004 | Klein et al. | |
| 7,031,661 B2 * | 4/2006 | Berkema et al. | ............ 455/41.3 |
| 7,080,371 B1 | 7/2006 | Arnaiz et al. | |
| 7,142,848 B2 * | 11/2006 | Owen et al. | .................. 455/418 |
| 7,190,476 B2 * | 3/2007 | Berkema et al. | ............ 358/1.15 |
| 7,293,115 B2 | 11/2007 | DaCosta et al. | |
| 7,493,487 B2 * | 2/2009 | Phillips et al. | .............. 713/168 |
| 7,506,083 B1 | 3/2009 | Lemke et al. | |
| 7,519,816 B2 * | 4/2009 | Phillips et al. | .............. 713/168 |

(Continued)

FOREIGN PATENT DOCUMENTS

EP          1107112 A2      6/2001

(Continued)

OTHER PUBLICATIONS

United Kingdom Intellectual Property Office, Search Report under Section 17, Patents Act 1977, U.K. Patent Application Serial No. GB0701493.9, search date: May 30, 2007.

(Continued)

*Primary Examiner*—Henry W Tsai
*Assistant Examiner*—Cheng-Yuan Tseng
(74) *Attorney, Agent, or Firm*—Kolisch Hartwell, P.C.

(57) ABSTRACT

A method of providing connectivity between a mobile device and a desktop computing device: providing the mobile device with software that can be installed in the desktop computing device to provide configuration data to application software operating on the desktop computing device, including device identification data for addressing the mobile device; using the mobile device to detect all desktop computing devices with which the mobile device can communicate; using the mobile device to select one of the desktop computing devices on which the application software is to be installed; transmitting the software from the mobile device to the desktop computing device; and using the desktop computing device to run the software to configure the application software using configuration data such that communications from the desktop computing device to the mobile device using application software are addressed directly to the mobile device from which the software originated.

14 Claims, 2 Drawing Sheets

U.S. PATENT DOCUMENTS

| | | | |
|---|---|---|---|
| 7,532,882 B2 * | 5/2009 | Owen et al. | 455/418 |
| 7,536,686 B2 | 5/2009 | Tan et al. | |
| 7,555,568 B2 | 6/2009 | Huang | |
| 7,555,573 B2 | 6/2009 | Cummins et al. | |
| 7,596,622 B2 * | 9/2009 | Owen et al. | 709/230 |
| 7,603,494 B2 | 10/2009 | Klein et al. | |
| 7,707,563 B2 * | 4/2010 | Wei | 717/140 |
| 7,707,632 B2 * | 4/2010 | Nath et al. | 726/23 |
| 2003/0078036 A1 | 4/2003 | Chang et al. | |
| 2003/0110094 A1 | 6/2003 | Gulliver et al. | |
| 2003/0110484 A1 | 6/2003 | Famolari | |
| 2003/0204843 A1 | 10/2003 | Barmettler et al. | |
| 2003/0216136 A1 | 11/2003 | McBrearty et al. | |
| 2004/0103308 A1 * | 5/2004 | Paller | 713/201 |
| 2004/0154014 A1 | 8/2004 | Bunger | |
| 2005/0044235 A1 | 2/2005 | Balahura et al. | |
| 2005/0130634 A1 | 6/2005 | Godfrey | |
| 2005/0257209 A1 * | 11/2005 | Adams et al. | 717/168 |
| 2005/0278461 A1 | 12/2005 | Ohta | |
| 2006/0094359 A1 | 5/2006 | Kim | |
| 2006/0143572 A1 | 6/2006 | Scott et al. | |
| 2007/0207777 A1 * | 9/2007 | Owen et al. | 455/411 |
| 2007/0239903 A1 | 10/2007 | Bhardwaj et al. | |
| 2007/0243887 A1 * | 10/2007 | Bandhole et al. | 455/461 |
| 2007/0245358 A1 * | 10/2007 | Hattori et al. | 719/321 |
| 2008/0293390 A1 * | 11/2008 | Yang et al. | 455/414.1 |
| 2009/0070500 A1 * | 3/2009 | Suomela et al. | 710/62 |

FOREIGN PATENT DOCUMENTS

| | | |
|---|---|---|
| EP | 1 439 721 A1 | 7/2004 |
| EP | 1717700 A2 | 11/2006 |
| WO | WO 98/39941 | 9/1998 |
| WO | WO 99/30429 | 6/1999 |
| WO | WO 01/08387 A1 | 2/2001 |
| WO | WO 2004/086735 A1 | 10/2004 |
| WO | WO 2005/101239 A1 | 10/2005 |

OTHER PUBLICATIONS

United Kingdom Intellectual Property Office, Search Report under Section 17, Patents Act 1977, U.K. Patent Application Serial No. GB0701513.4, search date: May 25, 2007.

U.S. Appl. No. 12/021,223, filed Jan. 28, 2008, Anwer.

European Patent Office, European Search Report, Application Serial No. EP08150692; search completion date: Jul. 3, 2008.

"Specification of the Bluetooth System, Profiles, Version 1.1, Part K:1, Generic Access Profile," Specification of the Bluetooth System (XP-002313541), Feb. 22, 2001, pp. 13-62.

* cited by examiner

# METHOD OF INDENTIFYING DEVICES IN MOBILE AND DESKTOP ENVIRONMENTS

CROSS-REFERENCE TO RELATED APPLICATION

This application claims the benefit under 35 U.S.C. §119(a) of U.K. Patent Application No. GB0701513.4, filed Jan. 26, 2007, which is incorporated herein by reference.

TECHNICAL FIELD

This invention relates to methods for identifying devices communicating in an environment that provides connectivity with mobile, desktop and network resources. In particular, the invention relates to methods for providing a mobile device with software identification that allows the desktop environment to communicate only with a designated device. The invention provides methods of interconnecting mobile phones, laptop or desktop computers and the Internet.

BACKGROUND ART

It is well known to provide desktop software applications that allow a mobile phone device to be connected and to share data and functionality. Such applications are typically provided on CD-ROM or can be downloaded from the Internet. Once installed, it is necessary to configure the desktop software application and mobile phone to allow them to communicate with each other since, at the time the application is installed in the desktop environment, it does not 'know' which mobile phone is to be connected.

The functionality of the software applications is well know, including storage of phone numbers and other contact details, sending and receiving SMS or email messages, and downloading or uploading media resources such as ringtones, photographs or movies, music files and the like. However, configuration of the software applications to connect to, and interact with a particular mobile phone has been problematic, especially where BLUETOOTH is used as the communication channel.

One particular problem with communication via BLUETOOTH derives from its widespread adoption for wireless connection of devices. It can be used for communication between phones, headsets, computers and peripheral devices and the like. Another problem is that most mobile phone handsets have relatively non-distinctive names, e.g. 'MOTOROLA Phone'. This means that it can be difficult for the desktop computer to uniquely identify a device such as a phone handset to which it is to be connected. There may be many BLUETOOTH devices within range, particularly mobile phones, all with similar or non-distinctive names.

It is an object of the invention to provide a method for providing proper identification of devices that does not suffer from the disadvantages of the previous systems discussed above.

DISCLOSURE OF THE INVENTION

This invention comprises a method of providing connectivity between a mobile device and a desktop computing device:

providing the mobile device with software that can be installed in the desktop computing device to provide configuration data to application software operating on the desktop computing device, including device identification data for addressing the mobile device;

using the mobile device to detect all desktop computing devices with which the mobile device can communicate;

using the mobile device to select one of the desktop computing devices on which the application software is to be installed;

transmitting the software from the mobile device to the desktop computing device;

using the desktop computing device to run the software to configure the application software using configuration data such that communications from the desktop computing device to the mobile device using application software are addressed directly to the mobile device from which the software originated.

The mobile device can be a mobile phone or other such wireless handheld device, PDA, or the like. The desktop computing device can be a laptop or other personal computer or the like. The network resources are preferably Internet resources but can also include private, local area or intranet networks.

Preferably, the software is included in a software loader file, the method comprising transmitting the software loader file from the mobile device to the desktop computing device, using the desktop computing device to run the loader software and direct it to a network resource to download application software and install it using the configuration data such that the installed application software can be run to provide functionality and connectivity between the mobile device, the desktop computing device and network resources. The software loader file is typically a small executable file handled by the operating system used by the phone, for example Java. The loader software can also include data identifying the mobile device so that the application software can be automatically configured to connect only to the originating mobile device.

Connection between the mobile device and the desktop computing device is preferably achieved using BLUETOOTH. Infrared and direct cable connections are also possible.

The step of detecting desktop computing devices preferably includes displaying all such devices so as to allow easy selection of the desired device by a user.

By using the mobile device to provide configuration data, communication between the desktop device and the mobile device can be specifically addressed, avoiding the possibility that it is sent to the wrong device and is thus made convenient and more secure.

MODE(S) FOR CARRYING OUT THE INVENTION

Figure 1:
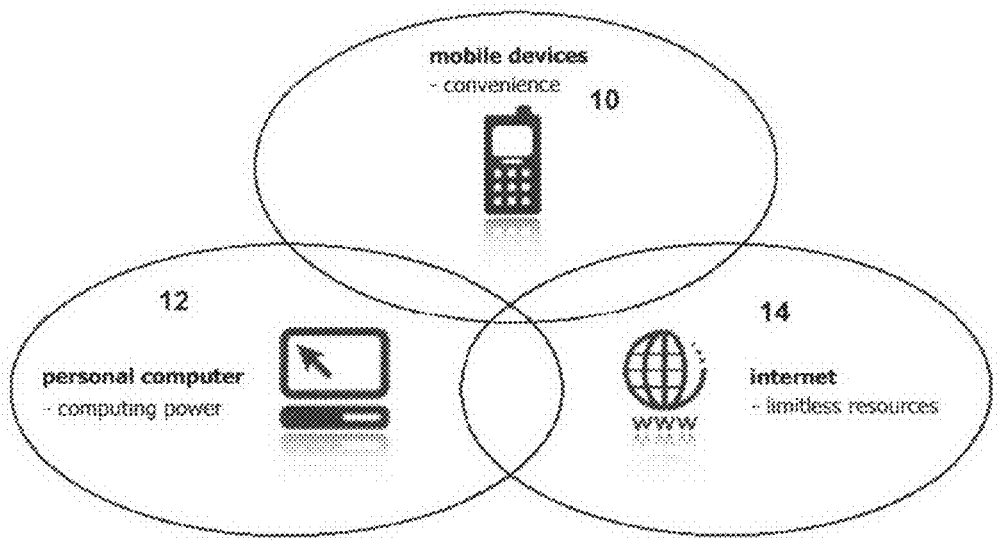
FIG. 1 shows a schematic of the various parts of the system to which the method of the application applies.

This invention provides a convenient manner to allow users of mobile devices such as mobile phones to configure system comprising the phone 10 and a desktop computer 12 (laptop, personal pc, etc.) to interact and provide contact to the Internet 14 (FIG. 1).

The basic components of the system comprise a phone client application, a loader application, an installer application, a web service application, a desktop client application, a desktop service application, a file manager service application and an interface manager application. The various applications are written in an appropriate language, e.g. Java (J2ME) or c++ depending on requirements.

Figure 2:
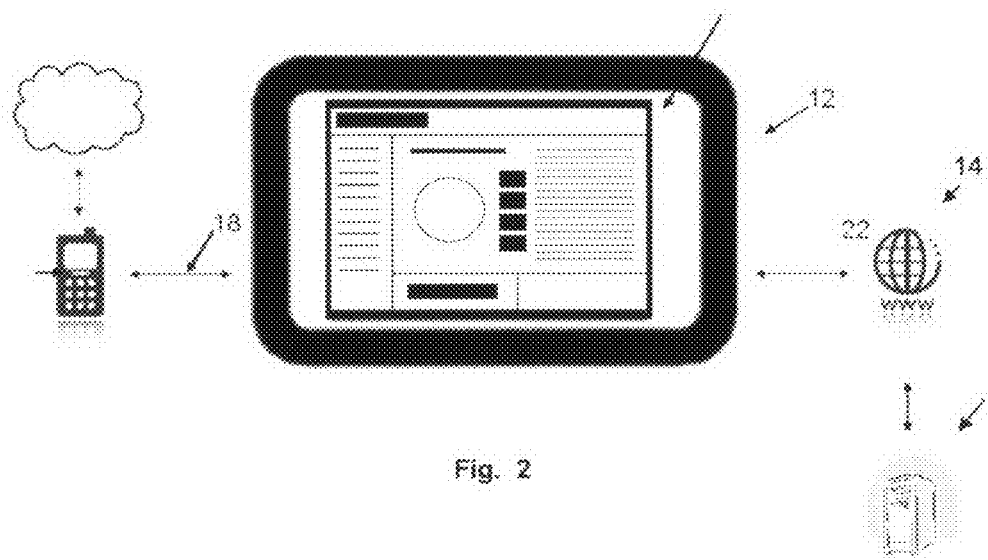
FIG. 2 shows a schematic of the desktop application.

The phone client application is java (J2ME) client on the phone 10 that is responsible for the distribution of the system on handsets. The J2ME client contains a small WINDOWS executable file that is downloaded to the desktop computer 12 and installs the full desktop application system 16 (see FIG. 2).

In use, the phone client application in pre-programmed into the phone handset when it is initialised. When it is desired to install the desktop applications on a specific computer, a connection 18 is made between the handset 10 and the computer 12 in question. In its simplest form, this connection can be a cable such as a USB cable directly connecting the desktop computer and handset. Another convenient way to connect the two devices is by means of a BLUETOOTH wireless connection. The first step is for the phone handset to identify the desktop computer or computers to which it either is connected (cable) or can connect (BLUETOOTH). Using the phone handset to identify the desktop computer makes the selection process simpler since there are generally fewer desktop computers within range of a phone handset than there are phone handsets within range of a desktop computer. This, combined with the fact that most handsets have relatively non-distinctive names (e.g. 'Motorola Phone') means that it can be difficult for the desktop computer to uniquely identify a phone handset to which it is to be connected, whereas the reverse situation is less likely to be the case.

Once the target desktop computer 12 has been identified on the handset, it can then be instructed to transmit the loader application via the link 18, for example by a BLUETOOTH OBEX push command.

The loader application contains an executable file which runs automatically when installed on the desktop computer to download the full installer application from a specified website 20 via the computer's connection 22 to the Internet 14. Once the loader application is transferred to the desktop computer, the user start the installation process (clicks on program icon). The loader downloads the install application package from a centralised web server and then auto-runs and install the full application software suite The loader application also writes handset device details to the desktop registry so that the fully installed service knows which handset device to connect to.

In one preferred embodiment, the loader is a small J2ME application including a simple WINDOWS/MAC executable file that is pre-installed on the handset.

It is desirable to keep the loader as small as possible. This is because of memory limitations on mobile phones and also speed of data transfer over BLUETOOTH connections. For this reason the client pulls the full setup from a centralised web server rather than containing any setup information itself The payload for BLUETOOTH distribution is a small WINDOWS application that displays a dialog box with a gauge on it detailing time left as the file downloads. Once the file has been successfully downloaded it is copied to a temporary setup directory and is run autonomously by the loader software.

The user runs the application and is presented with a list of BLUETOOTH enabled desktop computers within the proximity.

The user selects the preferred destination and initiates the download of the loader executable file. Security keys are requested/exchanged and the embedded loader is transferred to the desktop computer.

The loader J2ME client utilises two key areas of the JSR 82 (BLUETOOTH) specification, BLUETOOTH Search and Obex Transfer, which must be installed on the handset device for the system to work correctly.

The loader must first locate desktop/laptop computers in the network neighbourhood that are capable of receiving the payload, which it does by means of the BLUETOOTH search. This is an important functionality of the loader because there can be numerous devices responding to such search requests because of the penetration of BLUETOOTH technology in all manner of devices. It is therefore important to identify only devices that are capable of receiving and running the payload.

This is accomplished by utilising the device search and enquiry section of JSR 82. BLUETOOTH searches respond with a number of information fields that uniquely identify devices. The fields that are used by the loader are:

DEVICE_NAME—A simple human readable description of the device name (not unique).

DEVICE_ADDRESS—A unique binary address for the specified device.

DEVICE_CLASS—A bitmask identifying the type of device (e.g. 1=phone, 2=smartphone, 3=computer, etc.). In some cases this field can contain more information such as the type of computer (laptop or desktop for instance) however, this information is not required by the loader as it is only interested in devices of major type 'computer'.

Once all the devices have been found they are filtered out for just computers and are placed in a list from which the user can select.

The physical transfer of the file is handled by the JSR 82 OBEX layer. There are a number of issues at the remote end that must be handled by the client before, during, and after transfer. These revolve around different manufacturers of BLUETOOTH devices and how they handle file downloads. For instance if the user is running a device that is compatible with the MICROSOFT drivers they must first run a piece of software that allows file transfer via BLUETOOTH. A WIDCOMM device will allow the loader application to transfer the payload without prompting the user, but, the user must then navigate to the temporary download directory created during the transfer.

To handle this, the user is presented with a number of different options on the phone to identify the remote end driver set. The J2ME client presents the user with a number of differing graphical wizards that guide the user through a step by step process of identifying the remote BLUETOOTH driver set. Once the remote driver set is understood the user can be guided through the download process covering areas such as:

Where to find the downloaded file; and

How to initiate the download process on the computer.

The loader utilises JSR 82 to handle BLUETOOTH communications. In particular it uses the OBEX API to transfer the payload application.

The user runs the loader application from the desktop that is pre-programmed to download a specific file from a specific web server. The loader can be configured to connect to any server and request any file.

Once the requested file is (normally a single executable that runs an InstallShield setup package or a WINDOWS msi package) completely downloaded the loader application runs the downloaded file.

The installer application is responsible for installing the desktop client and service application and the file manager application and interface manager application on the desktop computer within its operating system environment. For example, in a WINDOWS OS environment, the service applications are installed as WINDOWS Services.

The desktop applications, when fully installed, include a desktop client, residing on the desktop computer 12, is the central tool in the system. This can be written in a language such as J2SE (Java), integrating with a web service and the main desktop services to control the flow of information through the system. The desktop client also integrates with mail handling software such as MICROSOFT Outlook's interface manager to handle contact and event management in the system.

Typical functions of the desktop client include:
Contacts: Add, Edit, Delete, Copy, Backup, Business Card look and feel, additional fields for Outlook: Share, Merge (MICROSOFT Outlook and Outlook Express);
Text Messages Delete, Copy, Backup, Reply, Send;
Events: Add, Edit, Delete, Copy, Backup, Share;
Documents: Add, Edit, Delete, Copy, Backup, Share;
Photos: Add, Edit, Delete, Copy, Backup, Share;
Music—Add, Edit, Delete, Copy, Backup;
Videos: Add, Edit, Delete, Copy, Backup, Share;
Ring-tones: Add, Delete, Copy, Backup, Purchase;
Wallpaper (Images): Add, Edit, Delete, Copy, Backup, Purchase;
RSS Feeds: enumeration of RSS feeds from around the world, with embedded IE (MICROSOFT Internet Explorer) viewer;
Internet Radio Station: Internet radio stations from around the world embedded into the viewer;
Phone Information Call history, Call Cost, Battery Life, Phone home page for more information about phone;
Groups: Add, Edit, Delete, Copy, Backup;
User Registration and Profiling: Large registration page for customer information repository; Credit Card Registration;
Device Profile—Setup and locate devices to attach to communicate with;
Voice Calls—Dial, Answer, Hang-up, Ignore;
Purchase—Download and purchase ring-tones and wallpaper securely using SSL.

The desktop applications also include a desktop service application DS that runs continuously whilst the computer is switched on. The DS can be written, for example, in c++ for maximum speed and efficiency as it has to deal with potentially large amounts of data in a relatively seamless and fast manner. The core functionality of the desktop service is to act as a conduit between the desktop client described above and the mobile phone 10.

Figure 3:
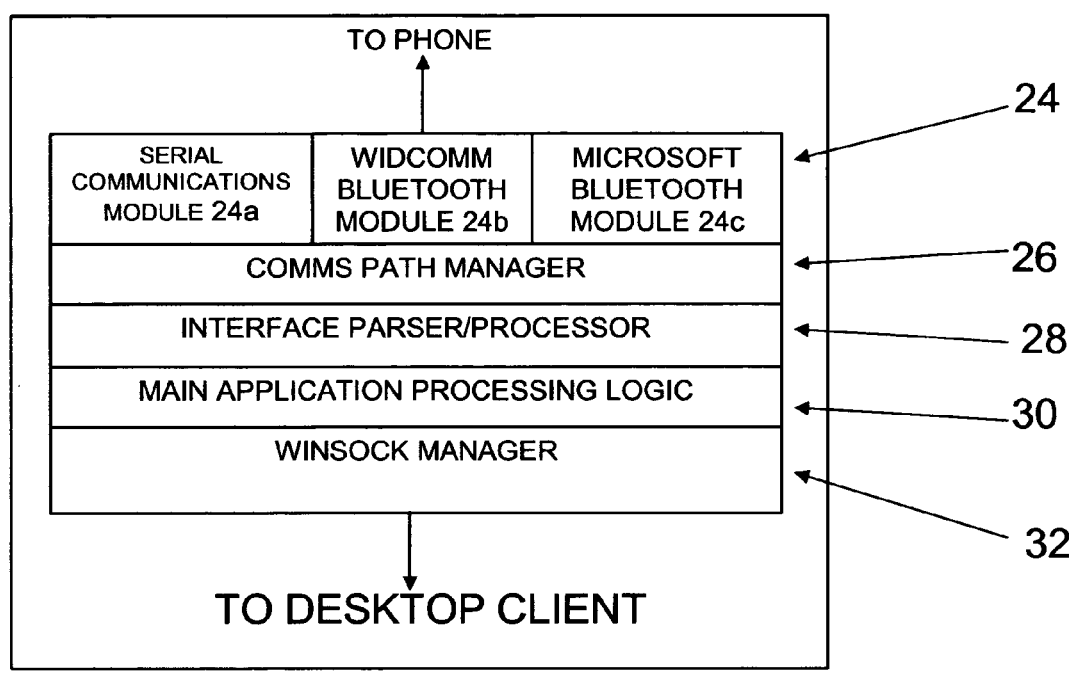
FIG. 3 shows the basic elements of the communication between the mobile phone and the desktop client.

FIG. 3 highlights the main functional components of the DS, comprising communications modules 24 for communication with the mobile handset, e.g. serial communications module 24a, Widcomm BLUETOOTH module 24b, MICROSOFT BLUETOOTH module 24c; a communication path manager 26; and interface parser/processor 28; main application processing logic 30 and a Winsock manager 32 for communication with the desktop client.

The DS uses three protocols:
A bespoke socket communications protocol that allows clients connected via socket (connection oriented TCP streamed socket) to send and receive data;
An AT command set as laid out by the GSM standards committee; and
Synchronisation mark-up language allowing file and object transfer.

The desktop service is responsible for maintaining connectivity to the phone. The service auto detects BLUETOOTH or cable connection and connects on the first available channel. Every command sent to this service is interpreted and turned into a command that the phone understands. The service is installed as a background task and runs when the PC is booted up and only stops when the PC is shutdown.

The file manager service application is installed as a background task similar to the main service application. This application monitors any changes made to the My Documents directory of the desktop computer for the current user. When files change it identifies if the file is a known type (Music, Video, Audio etc.) and then performs the appropriate action. The main use of this service is to generate thumbnails on the fly of images that are added/modified in this directory.

The Outlook interface manager is a simple DLL that communicates using MAPI with MICROSOFT Outlook to store and manage contacts and Events. The DLL has a JNI wrapper around it for integration with the desktop client.

Encryption can be applied to the various applications in the usual manner to improve system security.

A web service is provided as part of the Internet resource 14, 20 accessed by the desktop application described above. The software applications providing the web service can be written in PHP, for example. The web service is a fully functional web farm of high availability servers 20 that manage user content and information. All information is stored securely on raided fibre channel storage and can be accessed at anytime through a web interface residing on the desktop application system 16. The web service 20 provides scripts for the desktop client to call to access the data for the specific user. The web service stores all its information in a clustered SQL server database. Typical functions include:
Contacts—Add, Edit, Delete, Copy, Backup, additional fields for Microsoft Outlook;
Text Messages—Delete, Copy, Backup;
Events—Add, Edit, Delete, Copy, Backup, Share;
Documents—Add, Edit, Delete, Copy, Backup, Share;
Photos—Add, Edit, Delete, Copy, Backup, Share, Search, Browse;
Music—Add, Edit, Delete, Copy, Backup;
Videos—Add, Edit, Delete, Copy, Backup, Share, Search, Browse;
Ring-tones—Add, Delete, Copy, Backup, Purchase;
Wallpaper (images)—Add, Edit, Delete, Copy, Backup, Purchase;
RSS Feeds—enumeration of RSS feeds from around the world, with embedded IE (MICROSOFT Internet Explorer) viewer;
Internet Radio Station—Internet radio stations from around the world embedded into the viewer;
Groups—Add, Edit, Delete, Copy, Backup;
User Registration and Profiling—Large registration page for customer information repository, Credit Card Registration;
My Home Page—Public web page;
User Control Panel—Object management (Events, Contacts, etc.);
Publish Control—Allow users to publish to public domain;
Online Store—Allow purchase of Ring-tones and Wallpaper;
Payment Gateway Integration—Integration with payment gateway provided by banking or other financial service company;
SSL Certification—Secured SSL domain and logos;
Application Download—Download of InstallShield for main application;
Additional Web-space—basic default storage capacity, option to purchase further storage space;
Admin Control Panel—Publish, Ban, Content Management, RSS feed management, Radio station management.

The handset includes a corresponding service as part of the system which handles the normal phone functions and other system functionality:

Contacts—Add, Edit, Delete, Copy, Additional fields for specific device;
Text Messages—Delete, Copy, Backup, Send, Receive;
Events—Add, Edit, Delete, Copy;
Photos—Add, Edit, Delete, Copy;
Music—Add, Edit, Delete, Copy;
Videos—Add, Edit, Delete, Copy;
Ring-tones—Add, Delete, Copy;
Wallpaper (Images)—Add, Edit, Delete, Copy;
Device Searching—Query devices in neighbourhood (BLUETOOTH and Cable) and feed results back to desktop client;
Stack Integration—MICROSOFT, WIDCOMM, etc.;
Call History Log and Additional Phone Information—Call History, Call Duration;
Call Handling—Dial, Hangup, Ignore;
Profile Logon—Specify how to connect to phone from desktop client.

The J2ME handset client is responsible for naming the payload application when it is delivered to the remote computer. JSR 82 allows software to identify its own device address. BLUETOOTH device address are 12 digits long and are read in six pairs of two, e.g. 23:ab:12:0e:6f:8c.

Assuming a base name of the loader payload is loader.EXE. The J2ME client takes the device address and appends it to the end of the loader name. Using the above example the name of the file that is transferred will be loader23ab120e6f8c.EXE.

All of the applications are capable of identifying the name of the running application (itself) and the first job of the loader is to read the application name and break it up into its constituent components and write the device address into a configuration file on the hard-disk. The software then knows the address of the device that sent the payload and therefore does not need the user to go through a complex setup procedure to locate the remote device (phone) again each time it wishes to communicate because it already knows it.

For organisations that use proxy gateways for internet connectivity, the loader must respond to these settings and offer a dialog box for username and password entry. The main website will also store the download in a secure directory that will require an additional username and password that can be hard coded into the application.

Additional functionality may also be provided to the system. The J2ME client has BLUETOOTH connectivity built in that can be easily extended to provide additional support on mobile devices. Some sample applications include securing and synchronising personal data between desktop software and mobile phone; updating and synchronising EPG (electronic program guide) for mobile TV viewing from desktop and transfer to mobile phone, and providing in depth user support and help guides.

The invention claimed is:

1. A method of providing connectivity between a mobile device running a client software and a desktop computing device comprising a laptop or a personal computer running a desktop application integrating with web services:
providing the mobile device with an executable loader file to be installed in the desktop computing device to provide configuration data to the desktop application software operating on the desktop computing device, including device identification data for addressing the mobile device;
using the mobile device to detect all desktop computing devices with which the mobile device can communicate;
using the mobile device to select one of the desktop computing devices on which the desktop application software is to be installed;
transmitting the executable loader file from the mobile device to the desktop computing device; and
using the desktop computing device to run the executable loader file comprising downloading and installing the desktop application software via network resources from the web services using the configuration data such that the installed desktop application software provides functionality and connectivity between the mobile device, the desktop computing device and the network resources, and configuring the desktop application software using the configuration data such that communications from the desktop computing device to the mobile device using the desktop application software are addressed directly to the mobile device from which the executable loader file originated.

2. The method as claimed in claim 1, wherein the mobile device comprises a mobile phone handset, wireless handheld device, or PDA.

3. The method as claimed in claim 1, wherein the desktop computing device is a laptop.

4. The method as claimed in claim 1, wherein the desktop computing device is a personal computer.

5. The method as claimed in claim 1, wherein the network resources include Internet resources.

6. The method as claimed in claim 1, comprising preparing the executable loader file to include a pre-defined address parameter for the mobile device.

7. The method as claimed in claim 6, further comprising writing the pre-defined address parameter to a register on the desktop computing device.

8. The method as claimed in claim 7, further comprising using the pre-defined address parameter stored in the register in further communications between the desktop computing device and the mobile device.

9. The method of claim 1, wherein the executable loader file is handled by an operating system of the mobile device.

10. The method as claimed in claim 1, wherein the executable loader file also includes data identifying the mobile device origin so that the desktop application software can be automatically configured to connect only to the identified mobile device.

11. The method as claimed in claim 1, comprising providing a connection between the mobile device and the desktop computing device by connecting means selected from a group consisting of wireless, infrared and direct cable connections.

12. The method as claimed in claim 1, wherein the step of detecting all desktop computing devices includes displaying all such devices on the mobile device so as to allow selection of a desired desktop computing device by a user.

13. The method as claimed in claim 12, wherein the step of detecting all the desktop computing devices comprises using pre-defined name, address and class parameters for the devices.

14. The method as claimed in claim 13, comprising using Bluetooth search function to detect devices.

* * * * *